(12) United States Patent
Potts et al.

(10) Patent No.: US 11,059,732 B2
(45) Date of Patent: *Jul. 13, 2021

(54) RECONFIGURABLE LEACHING MODULE

(71) Applicant: Geomatrix Systems, LLC, Old Saybrook, CT (US)

(72) Inventors: David A. Potts, Lyme, CT (US); Daniel Borkowski, Meriden, CT (US); David Jewett, Old Lyme, CT (US); Michael Joseph Borruso, Iveryton, CT (US)

(73) Assignee: GEOMATRIX SYSTEMS, LLC, Old Saybrook, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/729,675

(22) Filed: Dec. 30, 2019

(65) Prior Publication Data
US 2020/0131064 A1  Apr. 30, 2020

Related U.S. Application Data

(63) Continuation of application No. 15/963,527, filed on Apr. 26, 2018, now Pat. No. 10,519,053.

(60) Provisional application No. 62/502,082, filed on May 5, 2017.

(51) Int. Cl.
*C02F 3/04* (2006.01)
*E03F 1/00* (2006.01)
*C02F 3/28* (2006.01)
*C02F 3/30* (2006.01)

(52) U.S. Cl.
CPC ............. *C02F 3/046* (2013.01); *E03F 1/002* (2013.01); *C02F 3/288* (2013.01); *C02F 3/302* (2013.01); *C02F 2203/006* (2013.01)

(58) Field of Classification Search
CPC ... E03F 1/00; E03F 1/002; E03F 1/003; E03F 11/00; C02F 3/046; C02F 3/288; C02F 2203/006
USPC ................ 210/170.08, 532.2; 405/36, 43, 45
See application file for complete search history.

(56) References Cited

U.S. PATENT DOCUMENTS

| | | | |
|---|---|---|---|
| 5,951,203 A | 9/1999 | Laak | |
| 6,443,652 B1 | 9/2002 | Houck | |
| 7,288,190 B2 | 10/2007 | Presby | |
| 7,374,670 B2 | 5/2008 | Potts | |
| 7,510,649 B1 | 3/2009 | Lavigne | |
| 7,614,822 B1 | 11/2009 | Burritt | |
| 7,713,414 B2 | 5/2010 | Presby | |
| 8,999,153 B2 | 4/2015 | Presby | |
| 10,519,053 B2 * | 12/2019 | Potts | ....................... E03F 1/002 |
| 2003/0038067 A1 | 2/2003 | Schwarzenegger | |
| 2005/0269253 A1 | 12/2005 | Potts | |

(Continued)

OTHER PUBLICATIONS

Ruck Nitrogen & Phosphorus Removal & Prefiltering Leach Field, www.rucksystems.com/rucka/; Apr. 2005.

*Primary Examiner* — Christopher Upton
(74) *Attorney, Agent, or Firm* — Grasso PLLC

(57) ABSTRACT

Reconfigurable water leaching modules are provided herein. These modules may comprise a plurality of dosing conduits and a plurality of leaching channels fluidly coupled to the dosing conduits where the leaching channels are reconfigurable from a first retracted position to a second extended position and where the leaching channels may hang downwardly from the dosing conduits in the second extended position.

21 Claims, 11 Drawing Sheets

(56) References Cited

U.S. PATENT DOCUMENTS

2008/0073259 A1   3/2008   Potts
2009/0145830 A1   6/2009   Couch

* cited by examiner

RECONFIGURABLE LEACHING MODULE

CROSS-REFERENCE TO RELATED APPLICATION

This application claims priority to U.S. utility application Ser. No. 15/963,527, entitled Reconfigurable Leaching Module, filed Apr. 26, 2018, now U.S. Pat. No. 10,519,053, issued Dec. 31, 2019. The '527 application is incorporated in its entirety by reference into this application. The '527 application claims priority to U.S. provisional application 62/502,082, which was filed on May 5, 2017 and is entitled Modular Reconfigurable Leaching Field. The '082 application is incorporated in its entirety by reference into this application.

TECHNICAL FIELD

Processes, systems, apparatuses, and articles of manufacture involving infiltration fields for use in residential, commercial, or industrial water infiltration systems are provided herein. More particularly, reconfigurable leaching modules, for use in a water infiltration field, where the leaching modules are reconfigurable from a first compact orientation to a second enlarged orientation, are provided herein.

BACKGROUND

Water infiltration systems vary in size and scope. They can be sized for processing large amounts of water from a municipality or other large cumulative systems for benefitting many residences, businesses, and industrial facilities serviced by the municipality. Water infiltration systems can also be designed and sized for single home residential use and for small-scale residential and commercial uses.

BRIEF SUMMARY

Embodiments may be directed to processes, apparatuses, systems, and manufactures involving reconfigurable leaching modules. These modules may comprise one or more leaching channels and may be connected together to form a leaching field of an infiltration system of a water treatment or other water processing system. Modules may include distribution conduits hydraulically coupled to leaching channels where the conduits and channels are connected such that they may be moved as a unit from one place to another, i.e., the conduits and channels may be modular. The conduits and channels, i.e., the module, while moveable, may also be reconfigurable such that they may be moved while in a first configuration and may be deployed and used in an infiltration field of an infiltration system while in a second configuration.

Water processing systems, such as wastewater treatment systems, may comprise one or several of these leaching modules for use in a leaching field, drain field or other infiltration field or an infiltration system where the modules, field, and system are configured to treat or otherwise process water having various sources including wastewater, storm water, and process water (all of which are herein collectively referred to as water). The infiltration fields may comprise one or more leaching modules, where each of the modules of a leaching field may have the same layout topology, or where leaching modules of an infiltration field or infiltration system may have different topologies or layouts. For example, some infiltration fields may have modules with different loading configurations, different leaching channel orientations, different leaching channel constructions, and/or different module layout topologies.

As noted, the leaching modules may be reconfigurable from a first configuration to a second configuration. This second configuration may have the leaching module occupy a larger overall volume than the first configuration. This increase in occupied volume may occur because the leaching channels of the modules comprising a modular infiltration field become more extended or fully extended while in the second configuration. Thus, by expanding or otherwise extending the leaching channels of a module or several modules, the distribution conduit(s) and leaching channel(s) of each module can occupy a larger volume of space than when in the nonextended or first configuration. Such reconfigurability may be beneficial for storage and/or transportation or for other reasons as well.

There are various adaptations of embodiments, and many permutations, that may be employed within the spirit and scope of this disclosure. Those of skill will understand that the invention is not to be limited to only those embodiments described herein and that other embodiments and applications consistent with the teachings herein would also fall with the scope of this disclosure. For example, and as explained in more detail below, these other permutations can include variations in components of the leaching modules, the infiltration fields, any surrounding Infiltration Treatment Media (ITM), the connections between the leaching modules and other leaching modules as well as other components of an infiltration field, an infiltration system, and/or a water processing system, or other components of a water processing system, the configuration of the infiltration fields themselves, and/or the configuration and components of infiltration systems comprising the leaching module(s), as well as still other permutations.

DETAILED DESCRIPTION

Figure 1:
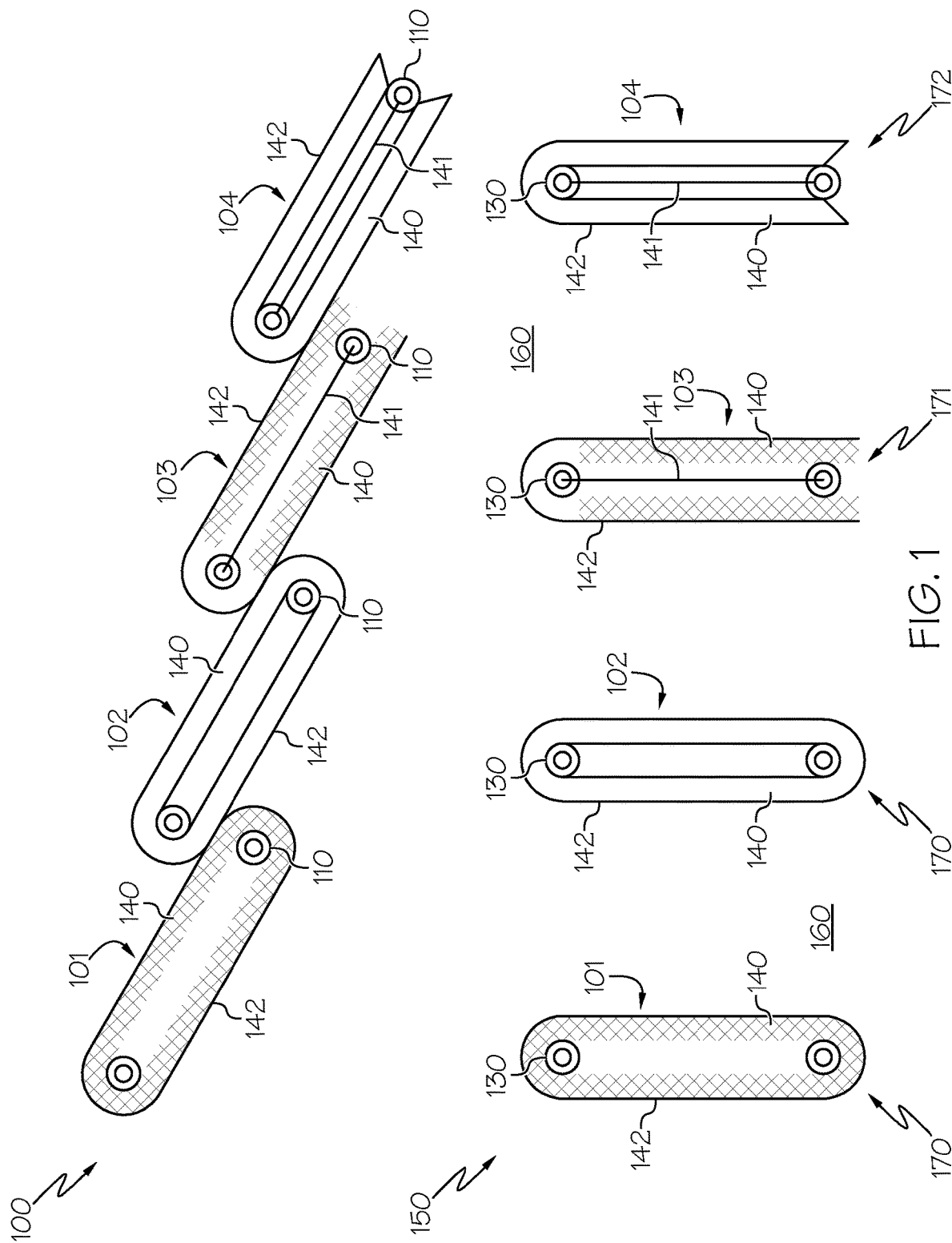
FIG. 1 shows cross-sectional views of leaching module components in a retracted position and in an extended position as may be employed in each of the modules disclosed herein as well as in other embodiments.

Embodiments may be directed to processes, apparatuses, and manufactures in which reconfigurable modular leaching fields are involved. Embodiments may include distribution conduits hydraulically coupled to leaching channels where the conduits and channels are connected such that they may be moved as a unit from one place to another, i.e., the conduits and connected channels are modular. The conduits and channels, while moveable, may also be reconfigurable such that they may be moved while in a first configuration and may be deployed and used in a leaching field of an infiltration system of a water treatment system or other water processing systems while in a second configuration. The leaching modules may, in embodiments, be assembled offsite and then shipped in a retracted position where later they may be configured into a, second, or expanded, configuration and placed in the expanded configuration for use in an infiltration system. The water processing system, which can comprise the infiltration system, can comprise other components such as processing tanks, vents, valves, blowers, pumps, electronic controllers, etc. A water processing system may treat or otherwise process water having various sources including wastewater, storm water, and process water (all of which are herein collectively referred to as water).

The second module configuration may occupy a larger space than the first module configuration. This increase in occupied space may occur because the leaching channels become more extended or fully extended while in the second configuration. Thus, by expanding or otherwise extending the leaching channels of a module, the conduit and channels can occupy a larger volume of space than when in their nonextended or first configuration. Such reconfigurability may be beneficial for storage and/or transportation, or for other reasons.

In use, a leaching field or other infiltration field of an infiltration system may be constructed in phases through the use of modules. Each module, when in an expanded configuration, may be or is suitable for treating and/or infiltrating a certain volume of water and can be configured into bedroom units or other measurable units for treatment of water in an infiltration field. In other words, a leaching module may be sized and/or otherwise configured to accept and process the anticipated water associated with a single bedroom of a multiple bedroom dwelling. Thus, if a four-bedroom home is being serviced, four modules may be installed in a leaching field of the infiltration system. When more flow is present, e.g., when more bedrooms are present or an increase in flow is anticipated or realized, additional modules may be added to the water processing system to increase the treatment and hydraulic capabilities of the system as a whole. Likewise, when fewer bedroom or less demand is anticipated or realized, fewer modules may be employed. The modules may be fabricated for a certain number of bedrooms, for example, one module may serve 1.5 bedrooms or two bedrooms or one bedroom, so when a bedroom is added, an additional module, calibrated for that single bedroom may be added.

In embodiments, the leaching modules may be connected in series, in parallel, or in combinations of series and parallel. They may be connected with one or more valves and may be vented as well. Infiltration treatment media (ITM) may be placed between the leaching channels as well as around, below, and above the installed leaching modules. This ITM may be placed during the installation of the infiltration system. The modules may be constructed offsite and brought to an installation site in a retracted, or collapsed, condition. Then, ahead of, or during installation, the modules may be reconfigured into their extended positions and installed as a leaching field or other infiltration field.

Various designs and materials may be employed in embodiments. PVC pipe or other pipe material may be employed as a support and/or dosing distribution conduit, while the reconfigurable leaching channels may be comprised of various combinations and configurations of geotextile materials, two-dimensional structures, three-dimensional structures (e.g., a pliable mat, cuspated panel, or other structure with or without fabric or membrane and a notable thickness, e.g., greater than approximately ⅛"), and flat pipes, among other things. Thus, the reconfigurable channels may be pliable in some embodiments and rigid in others, depending upon the materials comprising the leaching channels. Spacers may be used in the leaching channels to maintain a preferred channel height. These spacers may be positioned between upper distribution conduits and lower redistribution conduits, but may also be employed when no lower redistribution conduits are present and may serve to maintain a minimum height of a leaching channel.

Figure 11:
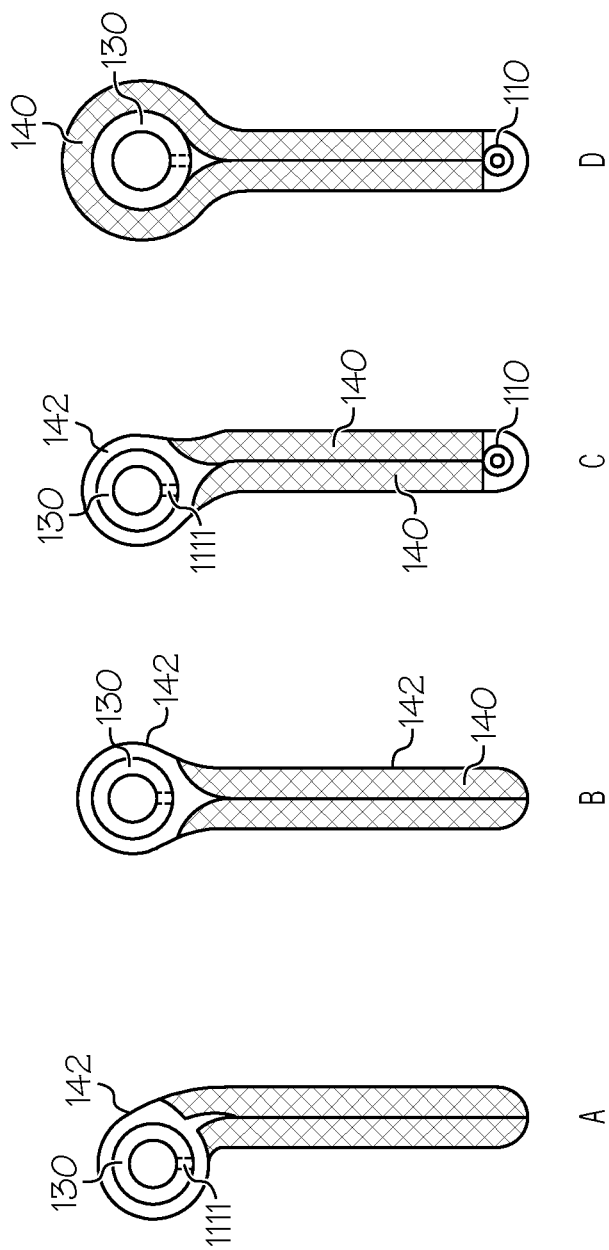
FIG. 11 shows cross-sectional views of several leaching channels and the positioning of inner materials and outer materials as may be employed in embodiments.

In embodiments, the fabric or membrane or other outer material of exemplary leaching channels may preferably be hygroscopic or hygroscopically treated. This outer material may encase the entire leaching channel or may encase only portions of it. For example, as shown in FIG. 1 the outer material may cover the distribution conduit and the inner material but not the bottom end in certain embodiments, while in other embodiments the full perimeter of a leaching channel may be encompassed by outer material. In embodiments, a preferred thickness for the three-dimensional geotextile may be approximately 0.5"-0.75"-1.5"-2" or so such that the treatment channels may have a weight and stoutness that promotes long term flow of water as well as installation alignment when moving the leaching channels from a first configuration to a second configuration. When pipes are 3" in diameter, leaching channels can have various thicknesses and can be 1"-3" in thickness or or more than 3" in thickness. When pipes are 4" in diameter, leaching channels can have various thicknesses and can be 1"-4" in thickness or or more than 4" in thickness. The leaching channels may have parallel side cross-sectional profiles, nonparallel side cross-sectional profiles, a triangular cross-sectional profile or other cross-sectional profiles. In some embodiments, as shown in FIG. 11, the leaching channel may be offset when hanging below the distribution conduit when in an extended configuration. Other extended configurations can have the leaching channel being more evenly distributed below the distribution channel when in an extended configuration. The earlier, offset, orientation be considered a "P" orientation while the later, more even, orientation may be considered more of a "T" orientation. Other orientations are also possible in embodiments, The leaching channels may be typically spaced approximately 4" to 6" apart from each other, and the space between them may be filled with soil, such as sand, and/or other suitable treatment media. The leaching channels preferably have a height to width aspect ratio of 3-96, but other aspect ratios within this range and outside of this range may be employed. As noted, the leaching channels may comprise both external materials and internal materials. The internal materials and external materials may include stringy structures, three-dimensional plastic matrixes, geotextile fabric or other geotextile materials, such as those identified herein, and/or other filler materials as well. Thus, in some embodiments, a leaching channel may comprise an external material of geotextile fabric and an internal material of geotextile, and some embodiments may include a second or third or further internal material such as another geotextile fabric as well as another geotextile. Still further combinations may also be used in embodiments.

During installation, a support or a plurality of supports may be used to support the distribution conduits and allow the leaching channels to move into an extended position. This support or supports may further enable soil, such as sand, polymer granules, or another ITM to be placed between the leaching channels. In preferred embodiments, the placement of the ITM should provide minimal disturbance to the positioning of the leaching channels after a module is positioned and the leaching channels are positioned in their deployed position. In other words, the placement of the ITM around extended leaching channels should be preferably accomplished with little movement to the extended leaching channels.

Various supports may be employed to support the dosing conduits and the leaching channels during installation and afterwards, during use. These supports may be placed at the ends of each module, along the length of the module, and/or at other positions as well. These supports may be permanent as well as removable. Permanent supports would remain with the infiltration field after the installation is complete, while removeable supports may be removed once the ITM is installed or the modules are otherwise supported during installation. Some embodiments may employ combinations of permanent and removeable supports.

Embodiments may comprise a rigid piping conduit framework, which can serve to disperse water to high aspect ratio leaching channels of the leaching modules. High aspect ratio channels may be considered to be leaching channels having a height to width aspect ratio in the range of three to ninety-six. For example, a leaching channel with a height of three inches and a width of one inch would be considered to have an aspect ratio of 3, which is considered a high aspect ratio as it falls in the range of 3-96.

As noted, leaching modules can fold flat or effectively flat for shipping and may be configured with a manifold riser or other conduit that can be set at an elevation coincident with or higher than the module, to preferably ensure that all or most of the infiltrative surface of that module, as well as any connected modules, may be utilized for infiltration. These risers or other conduits can serve as an input for an installed leaching module.

Supports for the modules can include exoskeleton support stakes that snap over the leaching channels and internal distribution conduits. These stakes or other supports can be configured to perform various functions, including: to hold the distribution conduit in the top of the high aspect ratio leaching channel, to hold the distribution conduit in place for backfilling at the desired elevation and location, as well as other functions. Certain supports, including certain stakes, can also have connecting members and sockets to snap to the leaching channels and join them together at a specific distance apart to allow for sand or soil backfilling or other ITM backfilling.

In certain embodiments, a manifold may be placed at the bottom of the leaching modules. This manifold may be configured such that it provides for the redistribution of water between most or all of the rows of leaching channels. Certain bottom interconnecting manifold designs may also be employed. These bottom interconnecting embodiments, as well as other embodiments, may have an inspection port integrated into the manifold to monitor water levels or other operational or maintenance features of the leaching channels. Inspection ports can also be placed into hydraulic communication without integration into bottom interconnecting manifolds of embodiments. Also, inspection ports may be coupled to a bottom manifold or formed as part of a bottom manifold in embodiments. These ports, as well as others, may be used to monitor water, system status, carbon source efficacy, and/or other conditions. Carbon sources placed in the manifolds, other portions of the leaching modules, and/or other portions of an infiltration system may include methanol, methanol substitutes, microC, sugar, and/or other sources. Still further, the ports may be used for connection to other portions of a water processing system, including denitrification systems and additional modules.

In some applications, a water processing system can include a treatment tank that can receive water, such as wastewater, allow for solids from the water to settle out, and/or remove Biological Oxygen Demand (BOD), Total Suspended Solids (TSS), nitrogen, Phosphorus, bacteria and/or pathogens, among other constituents. The water processing system can also often include an infiltration system comprising a leaching field downstream of any tank for receiving the water from the treatment tank, treating the water, and/or for discharging the water back to the environment for further treatment and groundwater recharge.

Some embodiments may use gravity dosing of infiltration fields, while some may employ pressure distribution and/or pressure dosing. Systems employing both gravity and pressurized distribution and/or dosing may also be employed in embodiments. In embodiments, pressure distribution systems can be outfitted with distal head monitoring ports, and these ports may also be utilized for cleaning the orifices. And, as shown in the accompanying figures, the rigid piping frame work can have a ladder configuration with the proximal and distal ends serving to provide a framework from which the leaching modules and internal piping can be supported.

Figure 5:
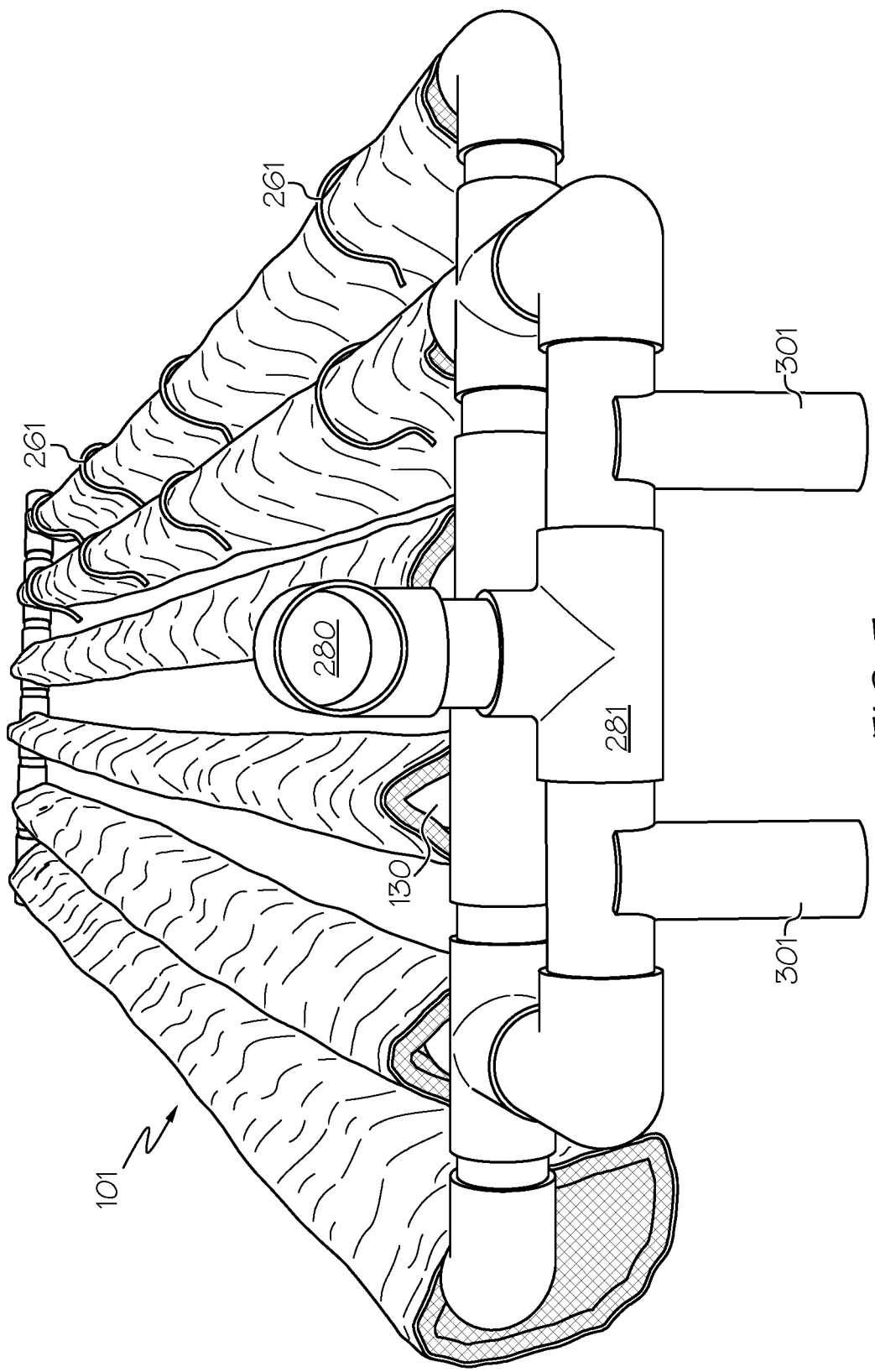
FIG. 5 shows a perspective view of the manifolded leaching module of FIGS. 3 and 4, with a manifold extension and a manifold riser as may be employed in embodiments.

As shown in FIG. 5, manifold risers may be employed in embodiments. The top elevation of such risers can be configured with a saddle to hold the pipe and may be set at a desired position such that an installed module may be held at the correct installation elevation prior to the placement of ITM. In embodiments, a plurality of manifold risers or standoffs may be employed and may be used to determine and set module installed elevation. In so doing, the entire area beneath the system does not need to be accurately graded as normal, rather just the area of standoffs preferably should be set at invert grade for a proper elevation and pitch to be set during installation. In avoiding the need to accurately grade the entire area beneath the system during installation, improvements in the speed of excavation and grading may be realized. The soil, such as sand, or other ITM may then be filled around the leaching modules to fill in areas that are too low in elevation and need ITM. Thus, manifold risers can have various heights in the same installation in order to accommodate the grading and installation excavation requirements of the site. By having different height manifold risers, the modules can be levelled or placed at an incline using the standoffs and without necessarily having the grading mimic the final top slope or lack of slope of the support pipes or conduits and the modules.

Preferred embodiments may provide quicker installations and more accurate placement of infiltration systems than conventional non-modular build-in-place systems. The exoskeleton support stakes can be utilized to fine tune the system elevation between the standoffs, if necessary, and to maintain desired separation between channels. The stakes may also be used to support more flexible conduits but may be less preferred for applications using rigid conduits. For example, when 1" pipe is employed as a distribution conduit, stakes may be particularly preferred. In contrast, when 2" pipe is employed as a distribution conduit, because this pipe is more rigid than 1" pipe, stakes may not be preferred. Likewise, the stakes may be less important for larger pipe sizes, including 3" and 4" PVC pipes.

As shown in the Figures, a redistribution manifold may be positioned at or near the bottom of a leaching module. Like the upper distribution conduits, lower redistribution conduits can use either or both of gravity redistribution and pressurized redistribution. These redistribution designs can serve to redistribute water evenly between all or most channels, as well as provide one or more ports to measure ponding or otherwise observe a status of the system.

FIG. 1 shows a side view of leaching module components in a retracted position 100 and an extended position 150. As can be seen, the leaching channels 101-104, may comprise various materials and may be closed loops or have open ends. Various materials may be used to construct the leaching channels, including geotextile, a flat pipe or flat pipe equivalent, flat panels, cuspated panels, stringy structures, and flexible mats. As can be seen, the leaching channels may comprise an outer material 142 and an internal material 140 that can serve to give weight and substance to the leaching channel. In preferred embodiments, the outer interface with the treatment media may comprise a hygroscopic material and any inner material 140 may be porous or otherwise allow water to pass through. The inner material may reside at various locations of the leaching channels. For example, in channel 103 the inner material does not encircle the distribution conduit 130 while in leaching channel 101 the inner material does encircle the distribution conduit 130. Spacers 141 connecting upper and lower conduits may also be used in embodiments and are shown in FIG. 1. Spacers 141 can serve to connect upper distribution conduits 130 and lower redistribution conduits 110, but can have other configurations as well. For example, when a single conduit is present in the leaching channel, the spacer can dangle from the single conduit and provide sufficient weight such that gravity serves to extend the spacer to its preferred or full length when the leaching module is installed. When the spacer is in this extended configuration, it can place forces on the leaching channel it supports and serve to extend the length of the leaching channel as well. Soil, such as sand, or other ITM 160 may be placed between the leaching channels, above the leaching channels, and below the leaching channels of FIG. 1 when these channels are installed.

The lower conduits in embodiments may preferably serve to redistribute water and monitor water levels in the channel among other uses.

In use, the module may be installed in an excavation and supported at each end with temporary or permanent supports and may be backfilled from above or otherwise, such that the backfill treatment media interfaces with the upright outer surfaces of the geotextile wraps hanging down off of the distribution conduits. Once backfilled, the module may be covered with additional geotextile, soil, such as sand, a plastic impermeable cover, grass, pavers, and other materials as well. For oxygenation or other purposes, the module may be approximately six inches or more below finished grade, although other depths may be employed in embodiments.

The bottoms of the leaching channels may have various configurations in embodiments. These bottom configurations can include full sealed ends 170 where the outer and inner materials fully wrap around any lower redistribution conduit, open unsealed ends 171, where the inner and outer materials of the leaching channel are not fully continuous at the bottom of the channel, and open sealed ends 172, where inner and outer materials of the leaching channel are not fully continuous about any bottom distribution conduit but the outer material covers the inner material at the open end of the channel.

Figure 2:
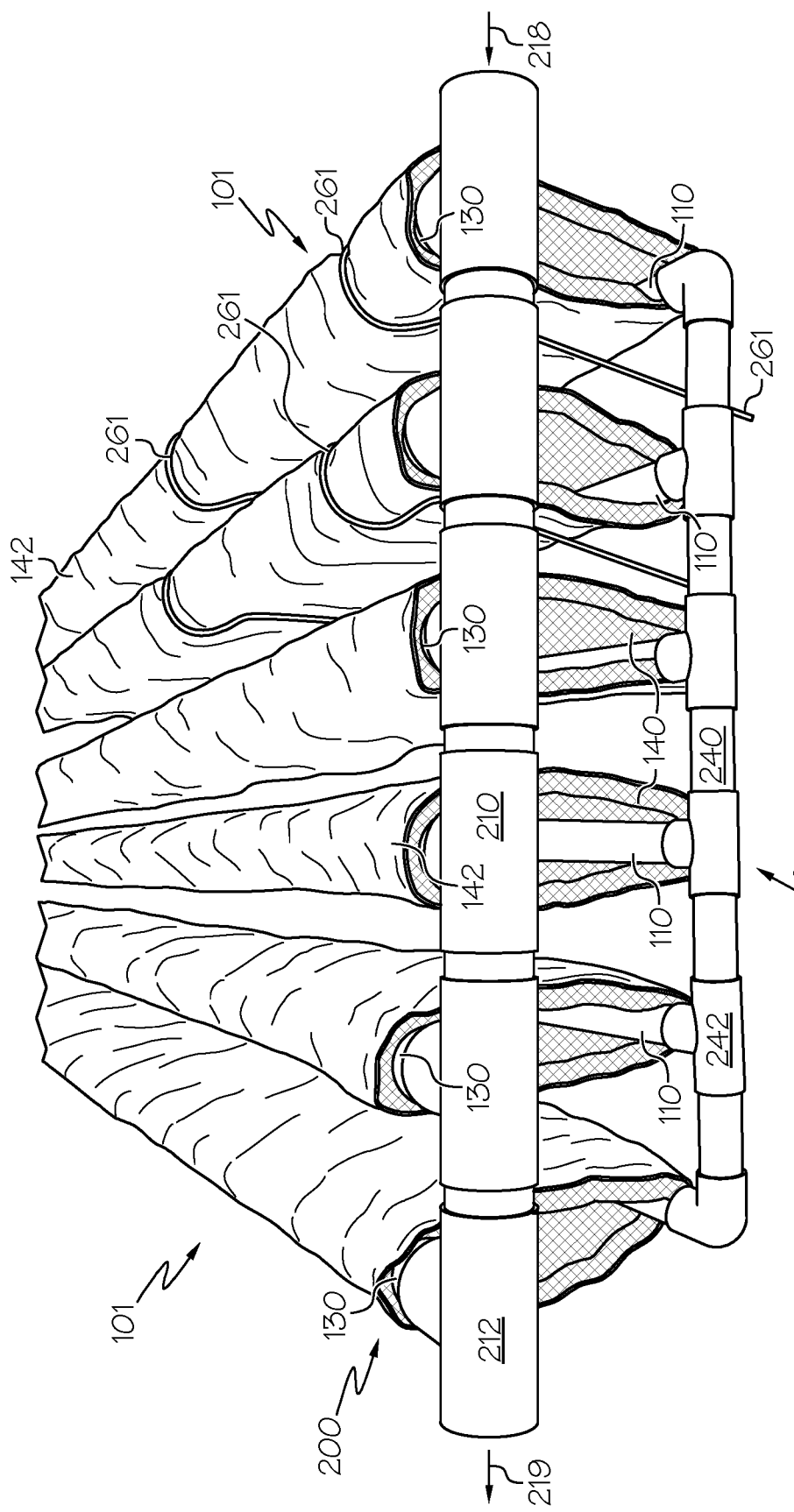
FIG. 2 shows a perspective view of a dual manifold leaching module where each leaching channel comprises manifolded upper distribution conduits and manifolded lower redistribution conduits as may be employed in embodiments.

FIG. 2 shows a dual conduit leaching module where each leaching channel has an upper distribution conduit and a lower redistribution conduit. Labelled in FIG. 2 are the dual manifold leaching module 200, leaching channels 101, upper tees 212, upper manifold 210, lower manifold 240, outer material 142, inner material 140, lower tees 242, inflow arrow 218, outflow arrow 219, upper distribution conduits 130 and lower redistribution conduits 110. In this and other embodiments, the upper distribution conduit 130 may be a pipe that may serve as a dosing conduit while the lower redistribution conduit pipe may be a pipe that serves as a collection conduit. Each of these conduits, both the distribution and redistribution conduits in this and other embodiments, preferably include a plurality of orifices within or around the leaching channels (see, for example orifices shown in FIG. 11 at 1111) through which water may travel into and out of the conduits. The lower redistribution conduits may also serve to pull or otherwise orient the leaching channels into an extended position. As can be seen in FIG. 2, the lower conduits can be centered or offset in the leaching channels and can serve to pull them straight down. In embodiments, the lower distribution conduits may be off-center and serve to orient the leaching channels on an angle other than 90°. In transit, the lower redistribution conduits may rest near or be nested alongside the upper distribution conduits, in a retracted two-dimensional arrangement for the leaching module. Then, when ready to install, the lower redistribution conduit may be released and allowed to drop such that the leaching module takes on a three-dimensional arrangement and occupies more space than in the retracted position.

Also, visible in FIG. 2 are exoskeleton spacers 261, which may be used to maintain the distance between the dosing conduit and the lower conduit during transport, during installation, after assembly, and at other times as well. Moreover, one or more spacers may be removed in embodiments once its spacing functionality has been satisfied. The spacers may comprise steel, iron, or other metals or alloys. The spacers may comprise other materials as well. For example, they may be polymer, carbon, glass, and/or cardboard, among other things.

Figure 3:
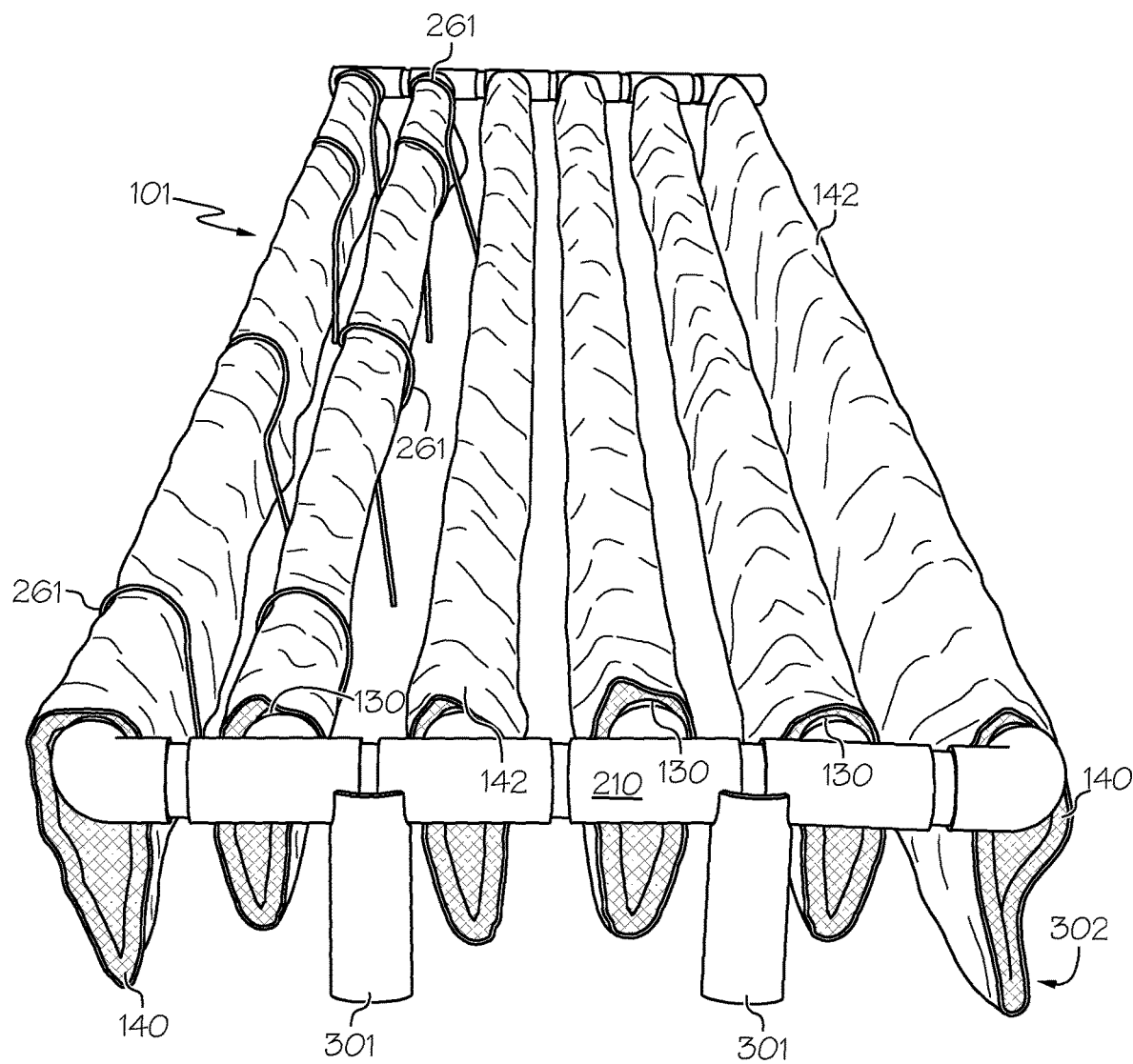
FIG. 3 shows an upper manifold leaching module with six leaching channels, six upper distribution conduits, and no lower redistribution conduits as may be employed in embodiments.

FIG. 3 shows a module with six distribution conduits and two upper manifolds 210 as may be employed in embodiments. Each of the distribution conduits passes though and supports a geotextile outer material 142 that is configured to serve as a leaching channel 101. As can be seen, this outer material 142 hangs down from the distribution conduits about twelve inches or so and extends the length of the distribution conduit. Other hanging lengths for the outer material may include about 6", 24", 36", and 48". These lengths, because of the orientation of the geotextile outer material 142 hanging off of the distribution conduits, approximate the height of the leaching module in an extended position. These lengths can also approximate the height between support, or distribution, conduits near the top of the modules and redistribution conduits at the bottom of the modules as shown in FIG. 2. Other dimensions may also be possible. As noted above and as can be seen in FIG. 3 and in other Figures, the geotextile outer material 142 may also cover an inner material 140 where one or both of these materials may be fabric, membrane, and/or other hygroscopic or non-hygroscopic materials. The exoskeleton supports 301 may be employed to support the leaching modules during installation such that an invert elevation may be set at the top or bottom of the supports 301 and this elevation may be relied upon for the invert elevation of the installed modules rather than needing to rely on any specific grading inverter elevation below the installed module. Because of the ability to set invert elevations with the supports 301, during installation, the modules may be rested on the supports 301 and then backfilled with ITM or other material without the necessity to carefully grade any ITM or other material below the placed module. Supports 301 may be removed after backfilling, or may remain in place. Also labeled in FIG. 3 at 302 is an example of a leaching channel where the inner materials touch each other.

Figure 4:
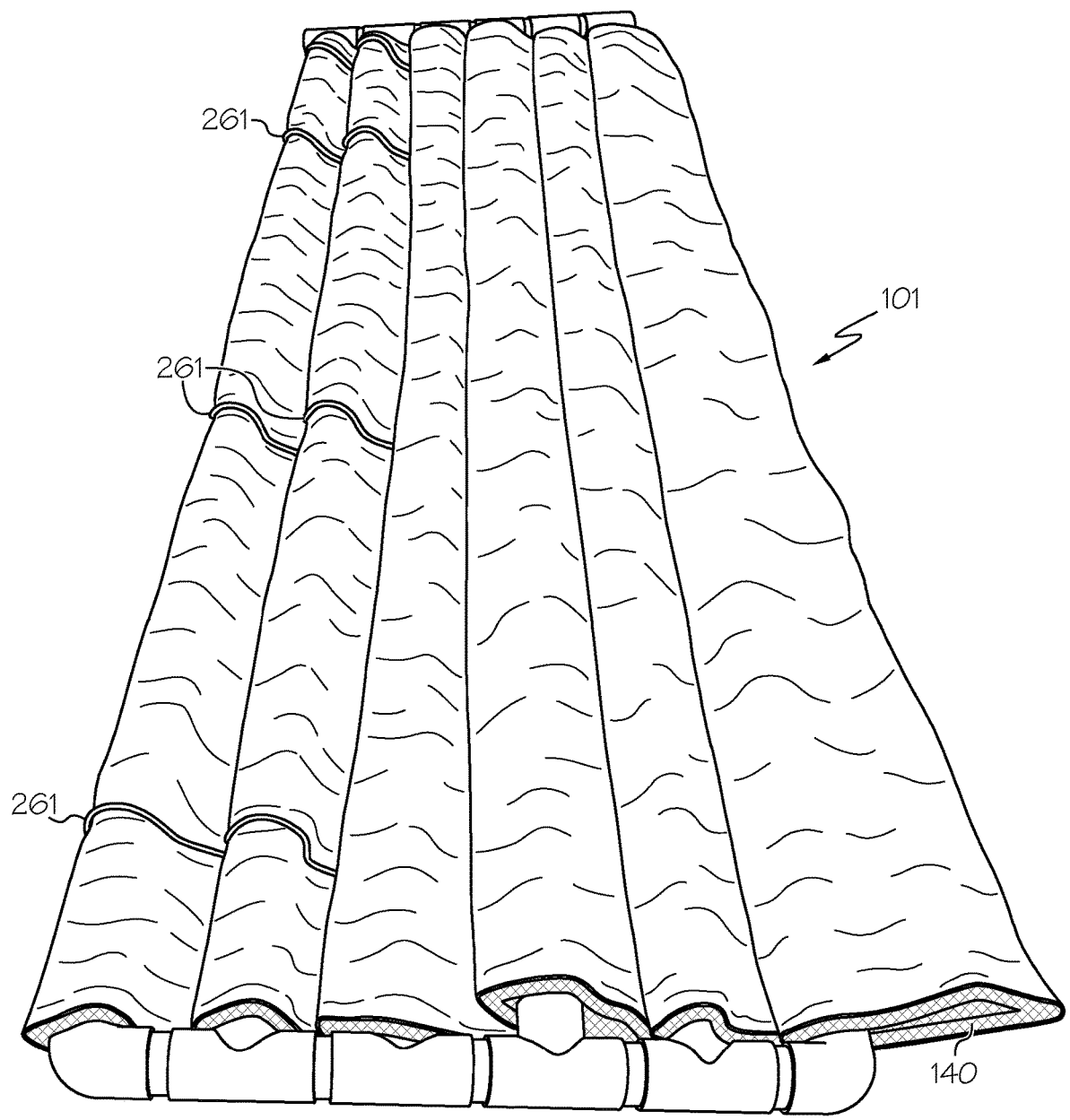
FIG. 4 shows the manifolded leaching module of FIG. 3 in a retracted position as may be employed in embodiments.

FIG. 4 shows the manifolded leaching module of FIG. 3 as may be employed in embodiments. The module of FIG. 4 shows the module of FIG. 3 in a collapsed, or retracted, position. As can be seen, the leaching channels 101 rest near the distribution conduits and provide negligible, if any, additional height to the module when in the collapsed position. This collapsed position may be referred to as a two-dimensional orientation because the height dimension is in a contracted position.

FIG. 5 shows a module with a manifold riser 280 and manifold extension 281 as may be employed in embodiments. This riser 280 and extension manifold 281 may be used to add head to water entering the module such that sufficient gravitational pressure may be present to move the water down the entirety or the majority of the length of each of the distribution conduits and along the entirety or the majority of the length of the leaching channels 101. As can be seen, the manifold riser 280 may be comprised of the same size and type of pipe as the distribution conduits. In embodiments, however, other materials and sizes may be used for both the manifold, and for the distribution conduits. A manifold riser may also be directly coupled to a distribution conduit without the use of an additional manifold as shown in FIG. 5. Also labeled are exoskeleton spacers 261 and distribution conduits 130.

FIGS. 3 and 5 show two exoskeleton supports 301 as may be employed to support the module during installation. The supports shown are positioned at the ends of the distribution conduits and may be beveled or otherwise cutout to seat the connector portions of the dosing conduits. During installation, after a final grade for the leach field invert is known, or at other times as well, the supports 301 may be placed in the excavation and the module may be set atop of the supports. In so doing the leaching conduits may hang downward, in a near final positioning and be ready for backfill. These supports 301 may be the same height and may have different heights as well. When the same height, the supports 301 may be installed at different elevations, which may be performed by forcing the supports deeper into the ground. This type of forcing can add stability to the support and can serve to maintain an upright orientation for subsequent mounting of a leaching module. Alternatively, supports having differing heights may be used. However achieved, the different heights may be used to level a module or series of modules when the excavation inverter elevation is sloped. The different heights may also be used to create a target slope for one or more modules different than the slope of the excavation in which the module may be installed. Also, steel, or other metal, exoskeleton spacers 261 can provide iron around the system modules, this iron can assist in preventing phosphorus migration.

Figure 6:
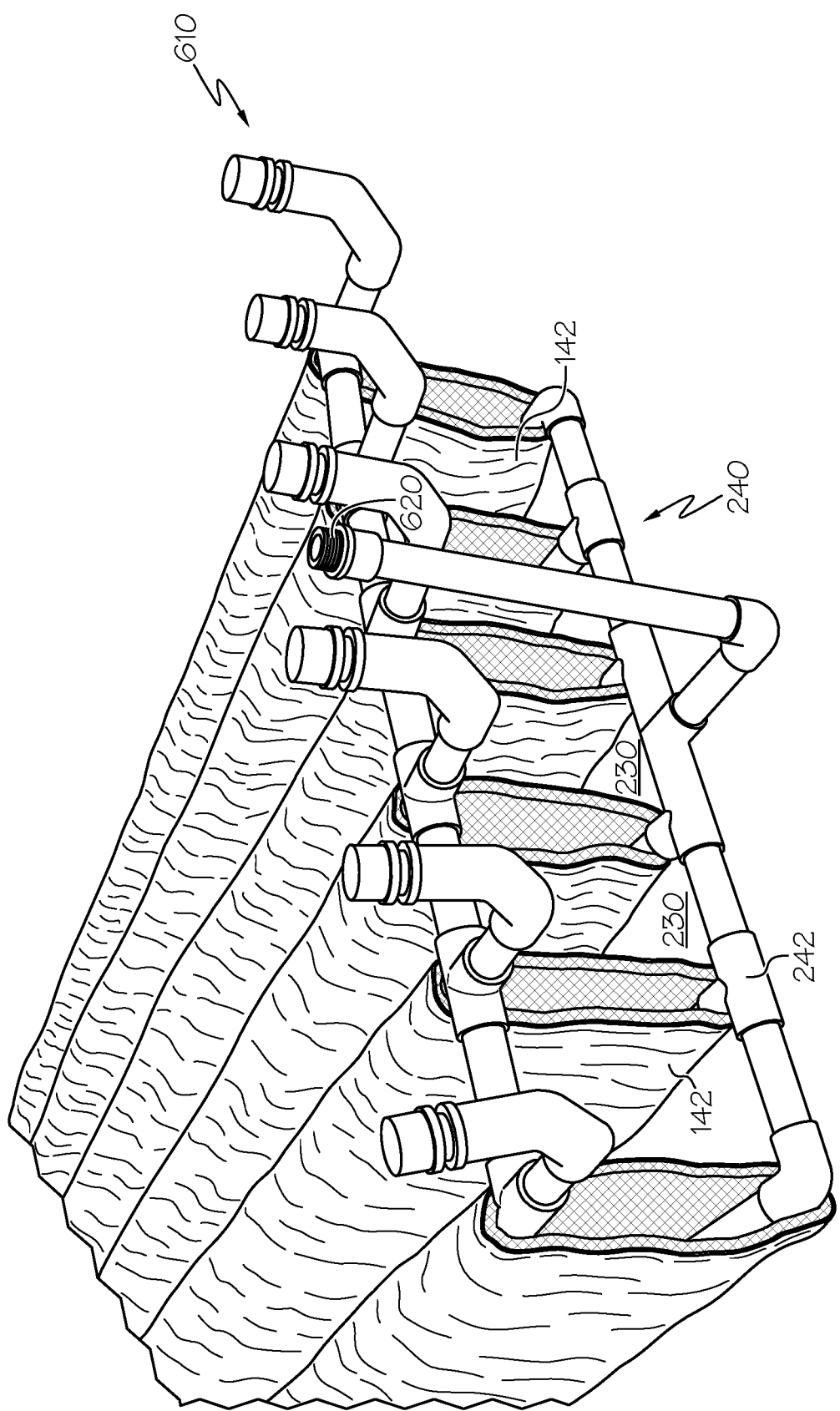
FIG. 6 shows a perspective view of the dual-manifold leaching module of FIG. 2, where the upper distribution conduits are manifolded, the lower redistribution conduits are manifolded, and the module also comprises risers and a dual-manifold observation port as may be employed in embodiments.

FIG. 6 shows how the upper distribution conduits may be manifolded for connection to each other and for connecting to an input, an output, a sampling port, and for other reasons as well. Labelled in FIG. 6 are: dual manifold observation port 620, single risers 610, which may serve as clean out or distal head ports to measure pressure at that end of an infiltration field, outer material 142, ITM 230, lower tees 242, and lower manifold 240. FIG. 6 may be considered to show a module of FIG. 2 that has been modified with single risers 610 and an observation port 620.

Figure 7:
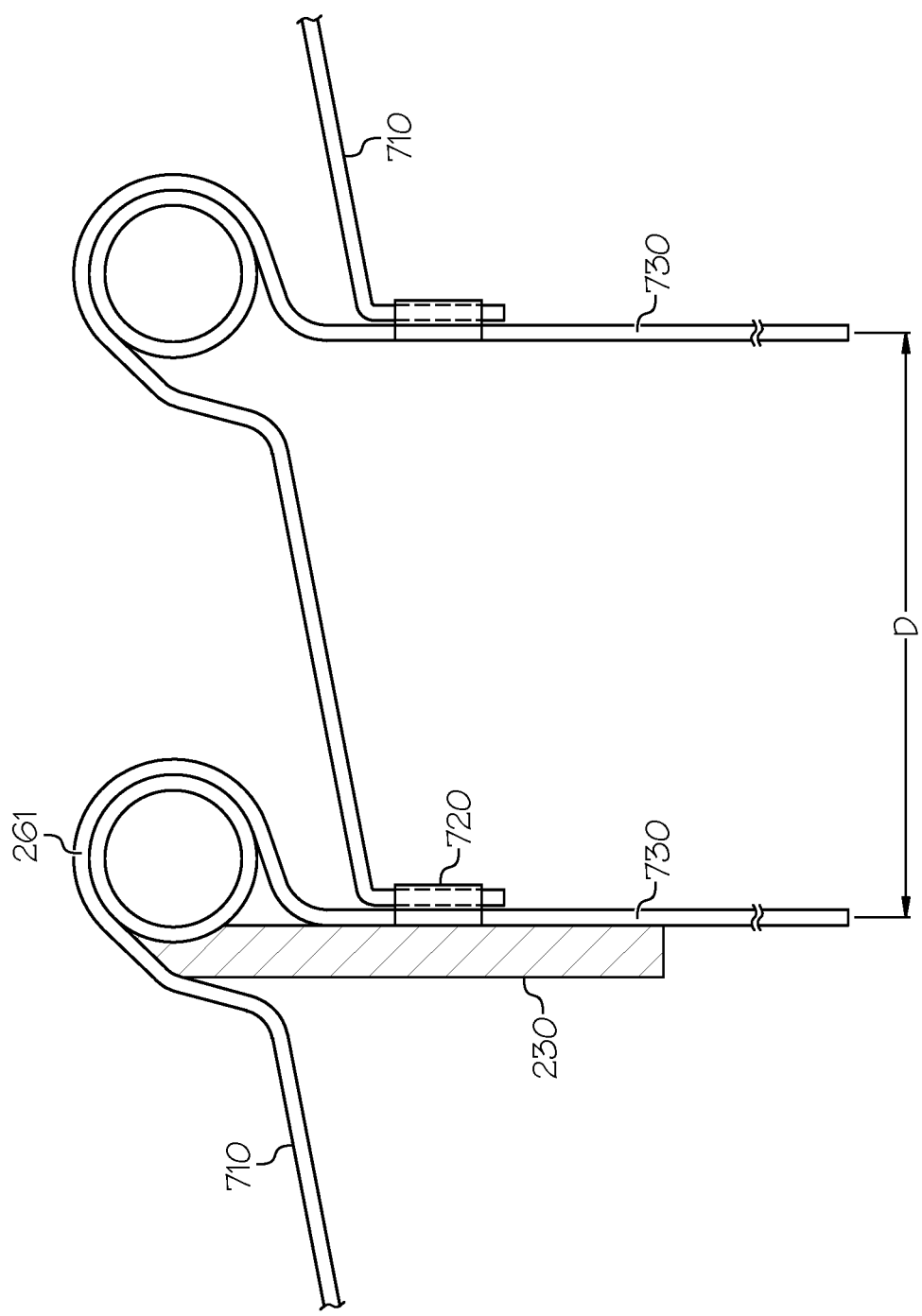
FIG. 7 shows a side view of exoskeleton supports, and a partial cross-sectional view of a portion of a leaching channel, as may be employed in embodiments.
Figure 8:
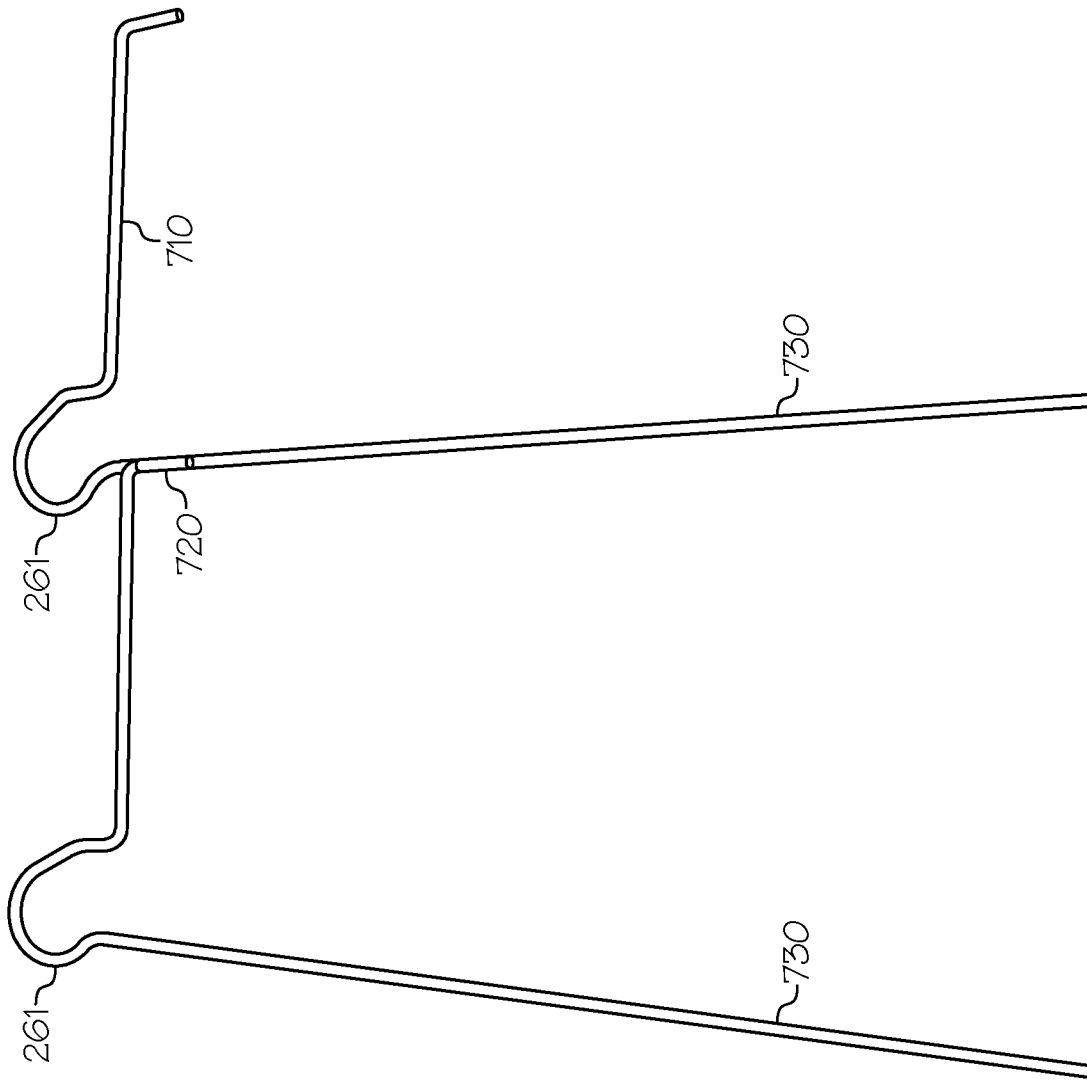
FIG. 8 shows two exoskeleton supports, connected to each other, as may be employed in embodiments.
Figure 9:
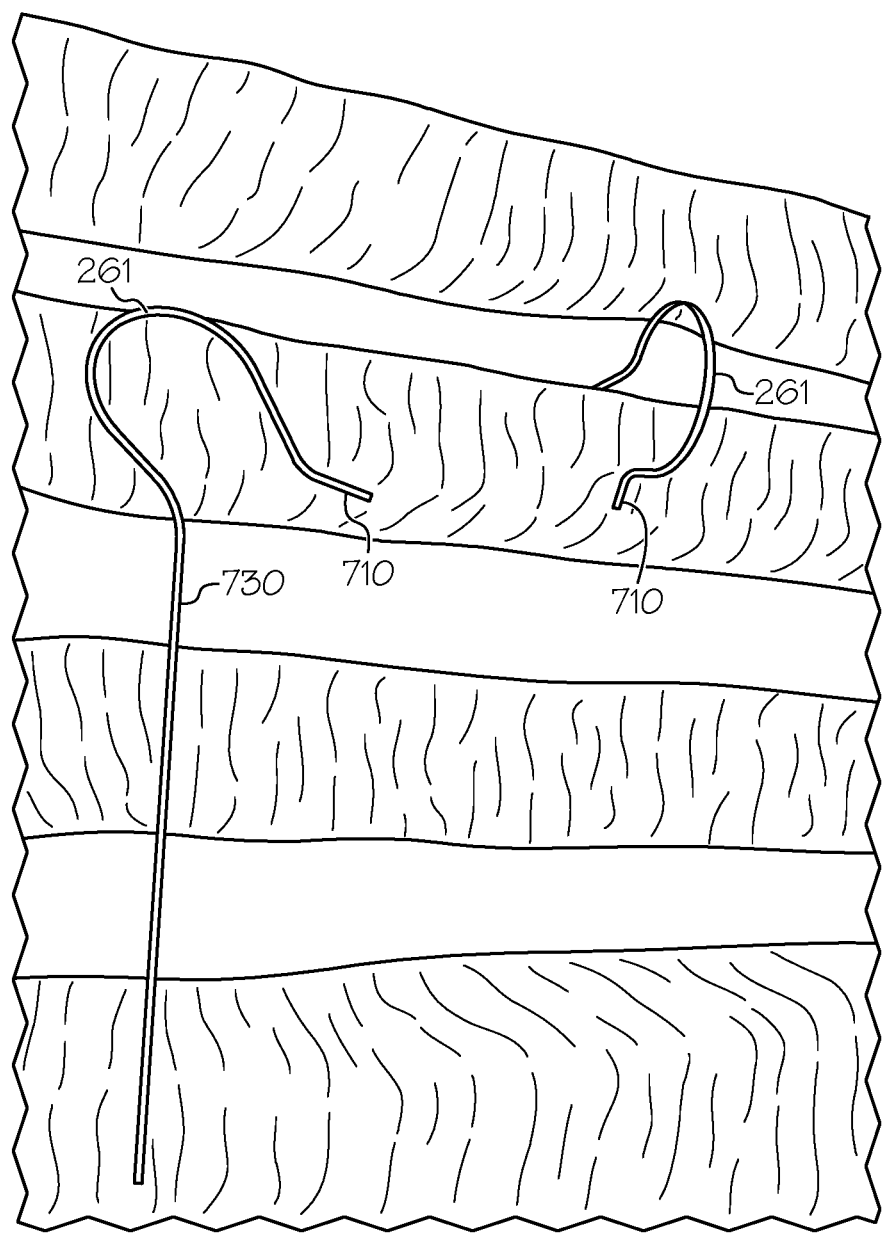
FIG. 9 shows two exoskeleton supports prior to installation about components of a leaching module, as may be employed in embodiments.
Figure 10:
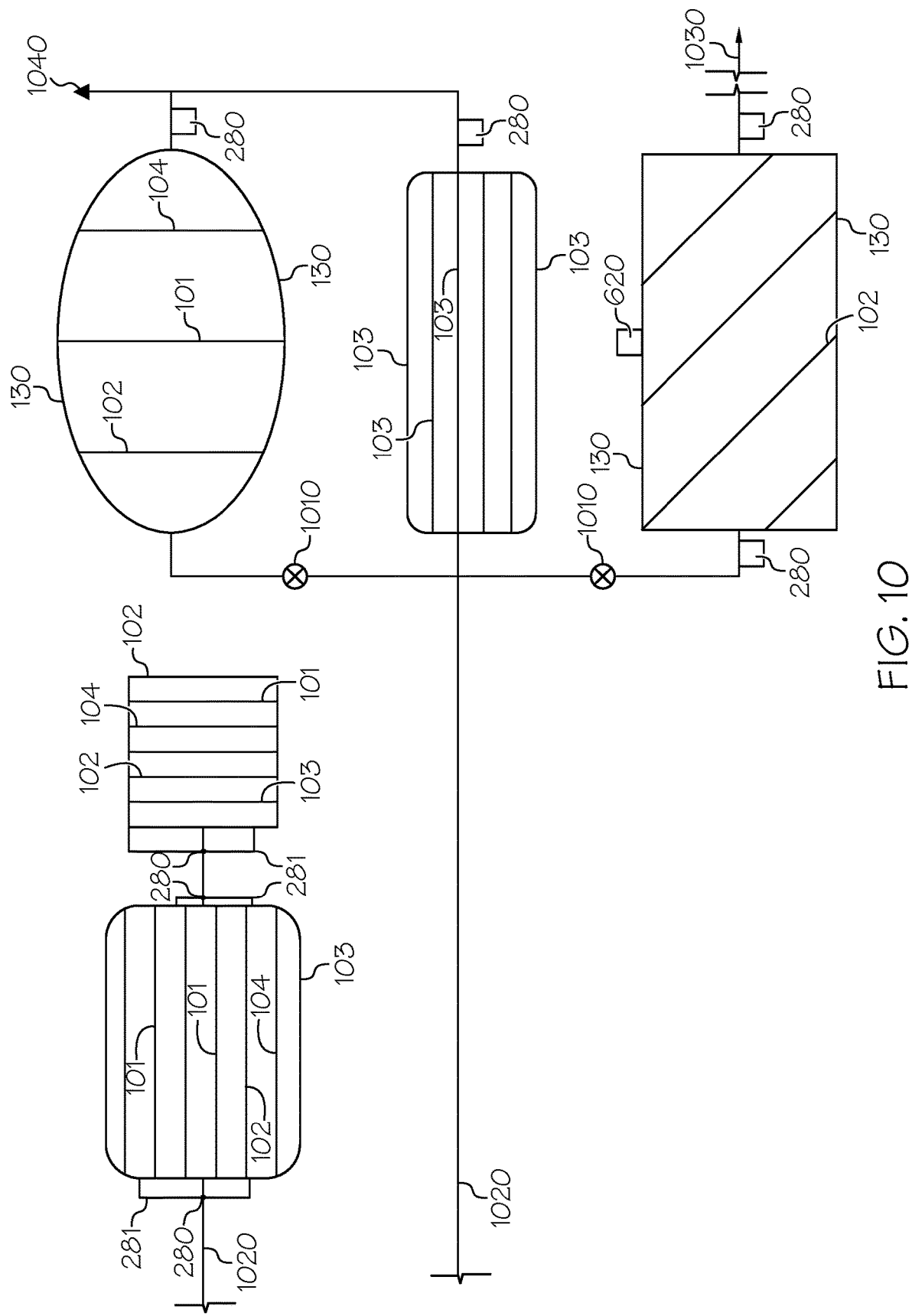
FIG. 10 shows a multiple module infiltration field of an infiltration system of a water processing system where the field employs various leaching modules, including those of FIGS. 2-6 as described herein, as may be employed in embodiments.

FIGS. 2, 3, 4, 5, and 7-9 show exoskeleton spacers 261 as may be employed to maintain distances between leaching channels of the same module or adjacent modules. These spacers may also be used to support the modules during installation in addition to or in place of the supports 301 shown in FIGS. 3 and 5. As can be seen, the exoskeleton spacers may be in the configuration of a "wire", and may have an anchor loop that serves to grab a distribution conduit of a leaching channel. The exoskeleton spacer is also shown with a leg portion 730 that extends down along the leaching conduit and an arm portion 710 that reaches the leg of the next wire spacer 261 and may connect to a receiver 720. This configuration may be said to mimic a shepherd's hook. As can also be seen, other configurations can be employed for the exoskeleton spacers. The leg portions 730 may have lengths prescribed to set the invert elevation of an installed module. Adjacent modules may have different leg portion lengths so that invert elevations between these adjacent modules can be different at an installation site. Length "D" shows spacing between spacers of adjacent leaching channels. Also labeled in FIG. 7 is ITM 230. FIG. 9 also shows an exoskeleton spacer before installation FIG. 10 shows an overview on how modules may be connected together in an infiltration system of a water processing system. As can be seen, a supply line 1020 may supply modules in series and/or in parallel. And the modules may be further coupled to other modules, to downstream treatment systems 1030, to recirculate water, to vents 1040, and to other outputs as well. Systems involving modules may also include clean-outs for replacing or servicing denitrification media or for other purposes as well. The modules may contain various types of leaching channels as shown in FIG. 10. Valves 1010 are also labelled in FIG. 10. Also labeled in FIG. 10 are leaching channels 101-104, distribution conduits 130, manifold riser 280, manifold extension 281, and observation port 620.

The water processing system can include small-scale applications that may employ a treatment system that can often include a treatment tank which can include a septic, settlement or other treatment tank, or other septic tank; these tanks can receive water, allow for solids from the water to settle out, and remove Biological Oxygen Demand (BOD), Total Suspended Solids (TSS), nitrogen, Phosphorus, bacteria, and/or pathogens, among other constituents. The water processing system can include an infiltration system comprising a leaching field with leaching modules as described herein. These tanks and fields can operate to treat the water and discharge the water back to the environment for further treatment and groundwater recharge. The leaching fields and leaching modules, when in operation, can serve to nitrify water and subsequent to nitrifying water, treat or partially treat it. At the same time or during subsequent steps, carbon sources may serve to denitrify the water being processed.

Inner and outer materials of the leaching channels may comprise geotextiles obtained from various manufacturers, and may include such geotextiles as Grasspave2, Gravelpave2, Rainstore2, Slopetame2, Draincore2, Surefoot4, Rainstore3 from Invisible Structures, Inc., 1600 Jackson Street, Suite 310, Golden, Colo. 80401, and Advanedge® flat pipe from Advanced Drainage Systems, Inc. 4640 Trueman Boulevard, Hilliard, Ohio 43026. Still further, inner and outer materials of the leaching channels may also comprise one or more geotextile comprising an irregularly coiled stringy structure contained between one or two layers of air-permeable sheeting, which layers may feel to the touch like thin felt. In embodiments, the geotextile may have only one layer and one side of that layer may have an irregularly coiled string plastic structure. In some leaching channel embodiments, no inner materials may be used, and in still other embodiments the inner material may only occupy a portion of the leaching channel. For example, the inner material may be present below the distribution conduit but not wrap around the distribution conduit. Still further embodiments may only employ an inner material present between upper and lower conduits and that does not wrap around either upper or lower conduits. In addition, a flat pipe or other inner material may be poisoned below an upper conduit or between both conduits and the outer material and then may wrap around this combination of materials.

FIG. 11 shows various cross-sectional views of leaching channels as may be employed in embodiments. Distribution conduits 130 are shown. Cross-sections C and D also each include redistribution conduit 110. Cross-sections A and C show a "P" type cross section while cross-sections B and D show a "T" type cross-section. Dosing orifices 1111 are labelled in FIG. 11 as well. As noted above and as shown in FIG. 11, the inner material 140 and outer material 142 of a leaching channel may have various combinations and orientations, and these orientations may occur whether a redistribution conduit is present or is not present. The inner material may wrap around the distribution conduit as in D or may only be present below the distribution conduit as in A, B, and C. The "P" configuration, where the leaching channel is offset from the distribution conduit can have offsets to the left or right of the channel (although only right offsets are illustrated in FIG. 11).

Still further, leaching modules may be installed in a vertical orientation such that the extended position reaches to a side of the distribution conduit and the leaching module. In embodiments where the orientation is primarily vertical, treatment media may be positioned between vertical or horizontal leaching channels, and during installation the treatment media may be placed from the bottom up of the excavation. Other orientations may also be employed.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

It should be noted that the terms "first", "second", and "third", and the like may be used herein to modify elements performing similar and/or analogous functions. These modifiers do not imply a spatial, sequential, or hierarchical order to the modified elements unless specifically stated.

As used herein, the terms "about" or "approximately" in reference to a recited numeric value, including for example, whole numbers, fractions, and/or percentages, generally indicates that the recited numeric value encompasses a range of numerical values (e.g., +/−5% to 10% of the recited value) that one of ordinary skill in the art would consider equivalent to the recited value (e.g., performing substantially the same function, acting in substantially the same way, and/or having substantially the same result).

Recitation of ranges of values herein are merely intended to serve as a shorthand method of referring individually to each separate value falling within the range, unless otherwise indicated herein, and each separate value is incorporated into the specification as if it were individually recited herein The description of the embodiments of the present invention has been presented for purposes of illustration and description but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

What is claimed is:

1. A reconfigurable leaching module comprising:
    a plurality of reconfigurable leaching channels,
        each leaching channel of the plurality of reconfigurable leaching channels having a first outer treatment media interface surface, a second outer treatment media interface surface, and a length,
        each leaching channel of the plurality of reconfigurable leaching channels being moveable from a stowed position to an expanded position, and
        when in the expanded position, the first outer treatment media interface surface being spaced apart from the second outer treatment media interface surface of each of the leaching channels of the plurality of reconfigurable leaching channels; and
    a first dosing conduit, the first dosing conduit positioned to dose wastewater into the space between the first outer treatment media interface surface and the second outer treatment media interface surface of a first leaching channel of the plurality of reconfigurable leaching channels when the first leaching channel is in the stowed position and when the first leaching channel is in the expanded position, and
        wherein each leaching channel of the plurality of reconfigurable leaching channels has a greater height when in the expanded position than when in the stowed position.

2. The reconfigurable leaching module of claim 1 wherein each leaching channel of the plurality of reconfigurable leaching channels is spaced apart from each other leaching channel of the plurality of reconfigurable leaching channels along at least a portion of its length.

3. The reconfigurable leaching module of claim 1 wherein each leaching channel of the plurality of reconfigurable leaching channels is spaced apart from each other leaching channel of the plurality of reconfigurable leaching channels along its entire length.

4. The reconfigurable leaching module of claim 1 further comprising a second dosing conduit, the second dosing conduit positioned to dose wastewater into the space between the first outer treatment media interface surface and the second outer treatment media interface surface of a second leaching channel of the plurality of reconfigurable leaching channels.

5. The reconfigurable leaching module of claim 1 wherein, the first dosing conduit is positioned in the space between the first outer treatment media interface surface and the second outer treatment media interface surface of the first leaching channel of the plurality of reconfigurable leaching channels.

6. The reconfigurable leaching module of claim 1 further comprising an exoskeleton support member supporting at least one leaching channel of the plurality of reconfigurable leaching channels.

7. The reconfigurable leaching module of claim 1 further comprising a plurality of exoskeleton support members, wherein each member of the plurality of exoskeleton members supports an associated leaching channel of the plurality of reconfigurable leaching channels.

8. The reconfigurable leaching module of claim 1 wherein each leaching channel of the plurality of reconfigurable leaching channels is independently moveable from a stowed position to an expanded position.

9. A reconfigurable leaching module comprising:
a plurality of reconfigurable leaching channels,
each leaching channel of the plurality of reconfigurable leaching channels having a first outer treatment media interface surface, a second outer treatment media interface surface, and a length,
each leaching channel of the plurality of reconfigurable leaching channels being moveable from a stowed position to an expanded position,
when in the expanded position each leaching channel of the plurality having a greater height than when in the stowed position, and
when in the expanded position the first outer treatment media interface surface of each of the leaching channels of the plurality of reconfigurable leaching channels being spaced apart from the second outer treatment media interface surface of each of the leaching channels of the plurality of reconfigurable leaching channels,
wherein each leaching channel of the plurality of reconfigurable leaching channels is spaced apart from each other leaching channel of the plurality of reconfigurable leaching channels along at least a portion of its length.

10. The reconfigurable leaching module of claim 9 wherein each leaching channel of the plurality of reconfigurable leaching channels is spaced apart from each other leaching channel of the plurality of reconfigurable leaching channels along its entire length.

11. The reconfigurable leaching module of claim 9 further comprising a first exoskeleton support, the first exoskeleton support having a height, the first exoskeleton support positioned at least partially lower than a portion of at least one leaching channel of the plurality of reconfigurable leaching channels.

12. The reconfigurable leaching module of claim 9 wherein each of the leaching channels of the plurality of reconfigurable leaching channels has a dosing conduit aligned with its length.

13. A reconfigurable leaching module comprising:
a first reconfigurable leaching channel,
the first reconfigurable leaching channel having a first treatment media interface surface, a second treatment media interface surface, and a length,
the first reconfigurable leaching channel being moveable from a stowed position to an expanded position, a height of the first leaching channel being greater in the expanded position than the height of the first leaching channel in the stowed position, and
when in the expanded position, the first treatment media interface surface being spaced apart from the second treatment media interface surface; and
a first dosing conduit, the first dosing conduit positioned to dose wastewater into the space between the first treatment media interface surface and the second treatment media interface surface of the first reconfigurable leaching channel.

14. The reconfigurable leaching module of claim 13 further comprising:
an exoskeleton support member positioned to set an elevation of the first reconfigurable leaching channel.

15. The reconfigurable leaching module of claim 13 wherein the first treatment media interface surface and the second treatment media interface surface are curved.

16. The reconfigurable leaching module of claim 13 wherein the first treatment media interface surface and the second treatment media interface surface do not meet at a bottom of the first reconfigurable leaching channel.

17. The reconfigurable leaching module of claim 13 wherein the first reconfigurable leaching channel has an open bottom or a closed bottom and a geotextile outer material with sealed ends.

18. The reconfigurable leaching module of claim 13 wherein the first reconfigurable leaching channel comprises a geotextile.

19. A reconfigurable leaching module comprising:
a plurality of reconfigurable leaching channels,
each leaching channel of the plurality of reconfigurable leaching channels being moveable from a stowed position to an expanded position, each leaching channel having a first height in the stowed position and a second height in the expanded position, the second height being greater than the first height, and
a plurality of dosing conduits,
each dosing conduit having a plurality of fluid exit orifices, each dosing conduit positioned to dose wastewater into one or more leaching channels of the plurality of reconfigurable leaching channels.

20. The reconfigurable leaching module of claim 19, wherein each leaching channel of the plurality of reconfigurable leaching channels comprises a first surface, a second surface, and a length; and when in the expanded position, the first surface of at least one first leaching channel of the plurality of reconfigurable leaching channels is spaced apart from the second surface of the at least one first leaching channel of the plurality of reconfigurable leaching channels.

21. The reconfigurable leaching module of claim 19, further comprising a manifold in fluid communication with each leaching channel of the plurality.

* * * * *